United States Patent
Kiel

(10) Patent No.: US 7,055,616 B1
(45) Date of Patent: Jun. 6, 2006

(54) AUTOMATIC ROW CROP IMPLEMENT POSITIONER

(76) Inventor: Christian Kiel, 1429 St. Mary's Dr., Crookston, MN (US) 56716

( * ) Notice: Subject to any disclaimer, the term of this patent is extended or adjusted under 35 U.S.C. 154(b) by 0 days.

(21) Appl. No.: 11/073,996

(22) Filed: Mar. 7, 2005

(51) Int. Cl.
*A01B 63/111* (2006.01)
*G06F 7/70* (2006.01)
*G06F 19/00* (2006.01)
*G06G 7/00* (2006.01)
*G06G 7/76* (2006.01)

(52) U.S. Cl. .............................. 172/4; 701/50
(58) Field of Classification Search .................. 172/2, 172/4, 453; 701/50
See application file for complete search history.

(56) References Cited

U.S. PATENT DOCUMENTS 4,031,962 A  6/1977  Ellinger ......................... 171/8

*Primary Examiner*—Christopher J. Novosad
(74) *Attorney, Agent, or Firm*—Curtis Harr

(57) ABSTRACT

A row following apparatus that attaches to the forward portion of the frame of a tractor towed harvester or cultivator which operates to monitor and adjust the position of the harverster. The row following apparatus uses a pair of pivotally attached sensing feet for following the crop rows. These sensing feet are attached to the frame of the present invention by a pair of automotive style ball joints. The use of the ball joints allows the pivotal movement of the sensing feet in a 360 degree manor that is unattainable with other methods of attachment.

18 Claims, 5 Drawing Sheets

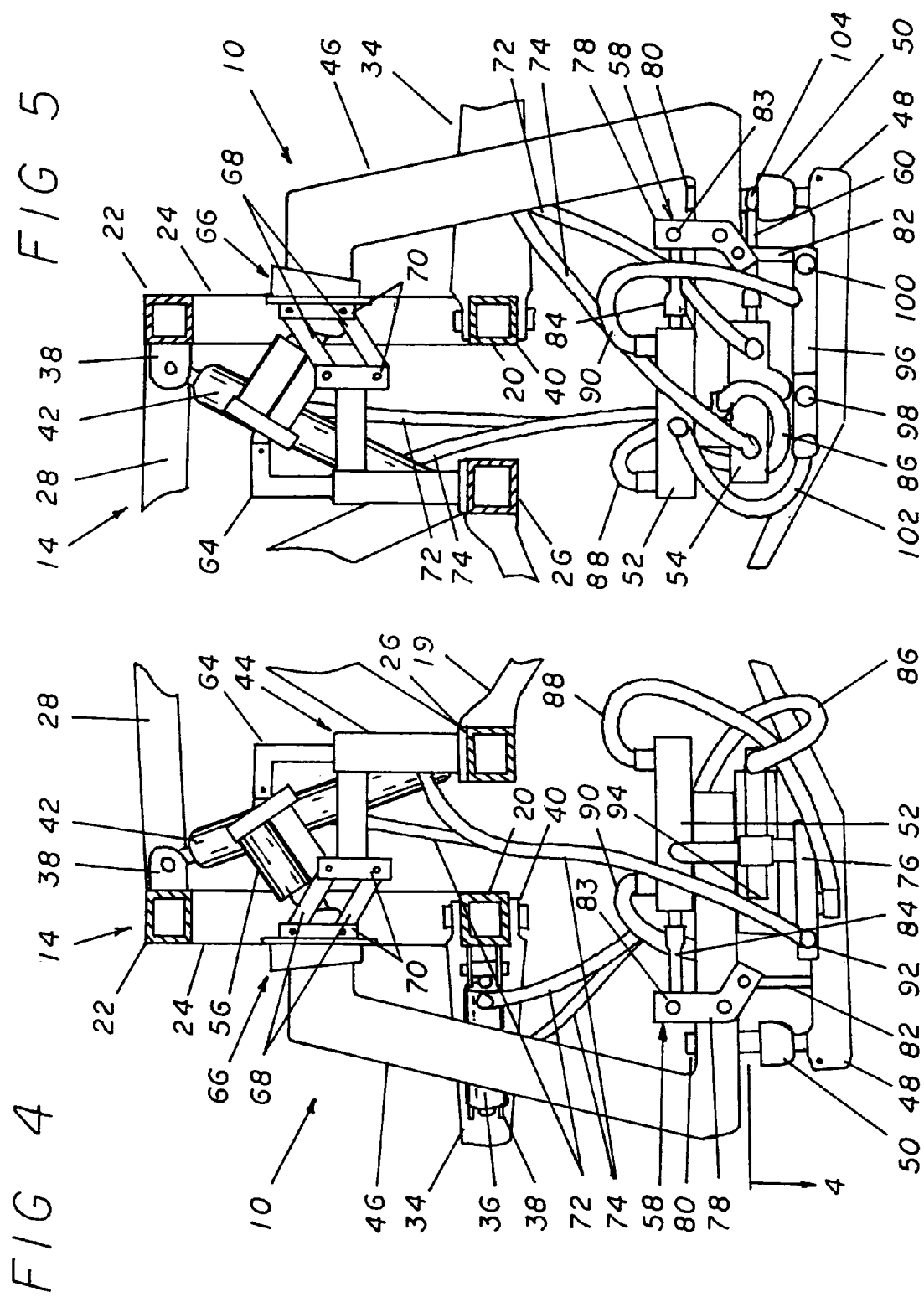

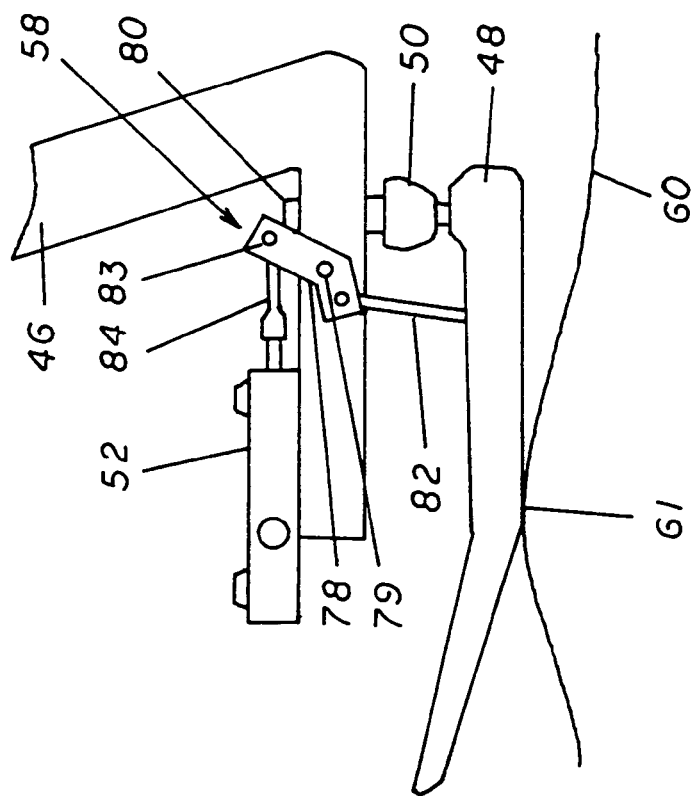
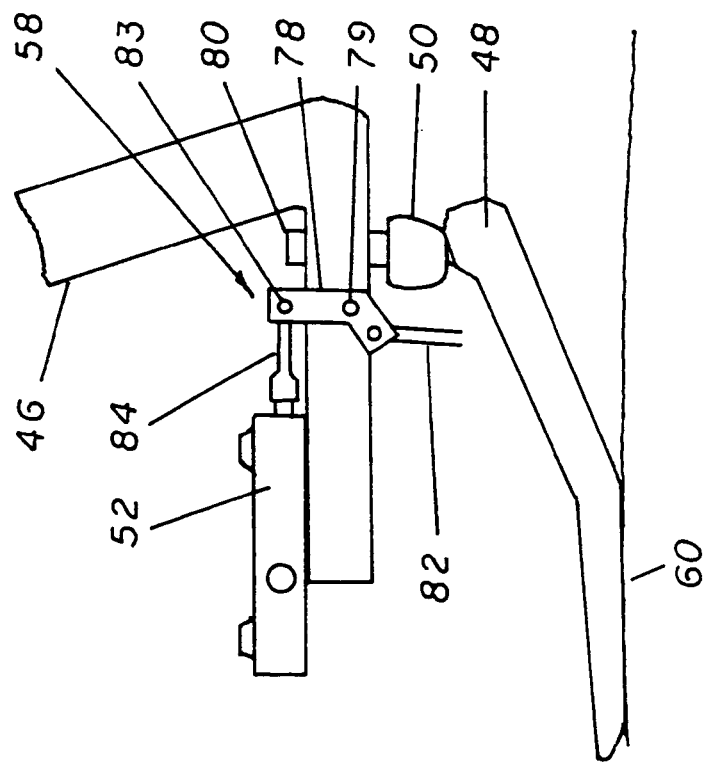

AUTOMATIC ROW CROP IMPLEMENT POSITIONER

BACKGROUND OF THE INVENTION

The present invention relates to an improvement in the methods used to control the position of farm implements, such as harvesters, relative to the location of the individual plants of a row crop within which the implement is being employed. More specifically, to a method of automatically adjusting the relative position of such implements in regards to the row crop without requiring the operator to make constant adjustments to the attitude of the towing vehicle.

The production of row crops such as sugar beets requires the use of specialized farm implements such as cultivators and harvesters that are drawn through the field during cultivating and harvesting operations. These procedures require that the farm implements be properly oriented at all times relative to the individual plants and their related rows comprising the row crop. This requirement creates difficulties as it is very hard for the operator of the towing vehicle to maintain the proper orientation as he travels up and down the row crop both because the rows are never completely straight and the towing vehicle may tend to wander relative to a straight line due to surface conditions or problems in the directional control apparatus of the towing vehicle. The potential wandering of the tow vehicle is transferred to the towed implement leading to positional variances in the horizontal plane between the implement's diggers the plants constituting the row crop. These horizontal variances often lead to damage to the crop as the diggers can be far enough off line to result in a destroyed or entirely missed plants.

Additionally, variances in the level or composition of the field surface can create problems in the vertical orientation of the towed implement causing the attached diggers to dig too deeply or to skip over entire sections of the row crop. Again, this misalignment in the vertical orientation can result in damage to the crop and implement or to a situation where sections of the row crop are left uncultivated or unharvested in the field, either of which are undesirable to the farmer.

In the past many possible solutions to these problems have been proposed, some of which are illustrated in the prior art. The most relevant of these for the purposes of the present invention is illustrated in U.S. Pat. No. 4,031,962 issued to Ellinger which describes an apparatus to control both the vertical and horizontal orientation of a harvester to which it is attached. The provided apparatus operates by the use of a pair of elongated sensing shoes that are positioned below the harvester so that they run along the surface of the ground during field operations in a manner so that each of the individual sensing shoes pass on opposite side of the row crops measuring changes in both the vertical and horizontal orientation of the row crop and making the appropriate adjustments to the relative position of the towed implement.

While the described apparatus accomplished its stated goals, a problem with its design results in deficits in its sensitivity and responsiveness that limit its overall effectiveness in the function for which it was designed. This problem is a result of the manner employed to pivotally attach the sensing shoes to the remaining portion of the apparatus in that they are not freely pivotal in all axises and therefore limited in their range of motion. This method of construction results in an apparatus that is less sensitive and responsive than is desirable and therefore, of limited value to the row crop farmer.

Therefore, it can be seen that it would be desirable to provide a mechanism which monitors the vertical and horizontal position of a towed implement and its attached diggers relative to the individual plants and rows of a row crop such as sugar beets. Additionally, that this apparatus be sensitive enough to accurately guide the harvester or other like implement through the rows of a row crop to maximize its operational potential in field operations.

SUMMARY OF THE INVENTION

It is the primary objective of the present invention to provide a method by which the position of a tractor drawn harvester or cultivator type farm implement, relative to the individual rows of a row crop such as sugar beets, can be constantly monitored and adjusted to ensure that the towed harvester is maintained in the proper position enabling it to perform its designed function at the highest degree of accuracy possible.

It is an additional objective of the present invention to provide such a method of positioning a towed farm implement that will automatically make the necessary adjustments in its position relative to the row crop without the need for any major corrective inputs from the operator of the towing tractor while working the field.

It is a further objective of the present invention to provide such a method of positioning a towed farm implement which is equipped with a pair of sensing feet that are pivotally mounted in a manner which allows for the greatest degree of pivotal flexibility providing them with a means by which they can be employed to monitor the position of the farm implement to the highest degree of accuracy possible which will translate to it operating at its greatest possible potential and result in higher crop yields.

These objectives are accomplished by the use of an apparatus that attaches to the forward portion of the frame of a tractor towed harvester or cultivator which operates to monitor and adjust the position of the harvester or cultivator in relation to the orientation of the row crop. In this purpose, the present invention is comprised of a vertically oriented frame to which is pivotally attached at its lower end a pair of sensing feet which run along the surface of the field during harvesting or cultivating operations.

The pivotal attachment of the sensing feet to the frame of the present invention is accomplished through the use of a pair of automotive style ball joints. The use of the ball joints provides a degree of sensitivity and accuracy to the invention that is unattainable with other methods of attachment. The reason for this is that while the body, or socket portion, of the ball joint is fixedly attached the frame of the invention, the ball portion and the attached sensing feet are free to pivot in any direction below the lip of the body portion of the ball joint. This means that any deflection of the sensing feet either in their vertical orientation through their contact with inconsistencies in the surface of the field or in its horizontal orientation through their contact with the relevant row of the row crop will be identified and compensated for by the adjustment of the towed implement.

The methods used to make these adjustments to the orientation of the harvester or cultivator are accomplished through the use of a hydraulic system comprised of a pair of sensing valves that are each in turn connected to a corresponding hydraulic cylinder. The hydraulic pressure that is necessary to operate this system is supplied through a connection to the towing vehicle's hydraulic system and is transferred to the appropriate components through a plurality of hydraulic pressure and return lines. This hydraulic pressure is employed to operate the hydraulic cylinders which in turn make the required adjustments to the orientation of the harvester or cultivator in relation to the row crop.

These adjustments are made in the horizontal plane when the sensing feet are deflected to one side or the other as a result of their contacting an obstacle. The described deflection of the sensing feet is transferred through a linkage to the horizontal sensing valve which in turn directs the flow of hydraulic pressure to the horizontal hydraulic adjustment cylinder. The horizontal hydraulic cylinder then expands or contracts to alter the angle of attack of the harvester or cultivator in relation to the towing vehicle. This corrective action is constantly taking place to ensure that the implement is always in the proper orientation with respect to the row crop that is being harvested or cultivated.

Additionally, the vertical plane adjustments are accomplished through a detected variance in the vertical orientation of the sensing feet which is transferred to the vertical sensing valve through a connecting linkage. These vertical variances are then transferred to the vertical adjustment cylinder through the hydraulic pressure and return lines. The vertical adjustment cylinder then adjusts the vertical orientation of the harvester or cultivator through its expansion or contraction which raises or lowers the diggers attached to the implement frame in relation to the surface of the field. The use of this system ensures that the diggers are constantly maintained in the proper orientation with respect to the field enabling the harvester or cultivator to operate at its maximum potential at all times.

For a better understanding of the present invention reference should be made to the drawings and the description in which there are illustrated and described preferred embodiments of the present invention.

DESCRIPTION OF THE DRAWINGS

FIG. 4 is a side elevation cut-away view of the present invention taken along line 3 of FIG. 2 illustrating the orientation of its major components and further detailing the method used to attach it to the pivot frame of the farm implement.

FIG. 5 is a reverse side elevation cut-away view of the present invention of FIG. 4 and illustrates its components that are not visible in the previous illustration.

FIG. 10 is a side elevation view of the sensing feet components of the present invention illustrating their orientation when in the neutral vertical position.

FIG. 11 is a side elevation view of the sensing feet components of the present invention illustrating their orientation when in the engaged vertical position.

DESCRIPTION OF THE PREFERRED EMBODIMENT

Figure 1:
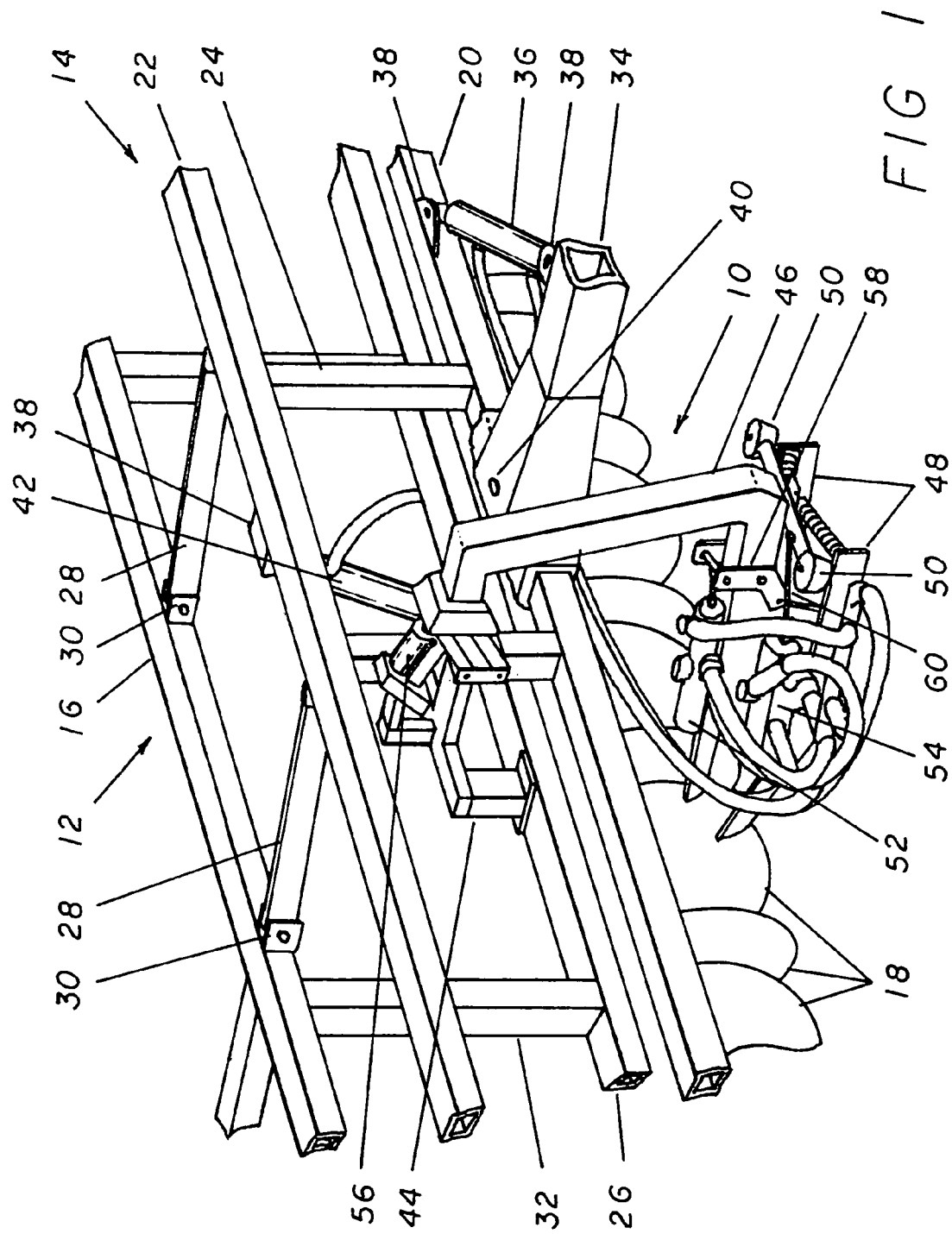
FIG. 1 is a perspective view of a generalized towed farm implement illustrating the manner in which the present invention is connected to it.
Figure 2:
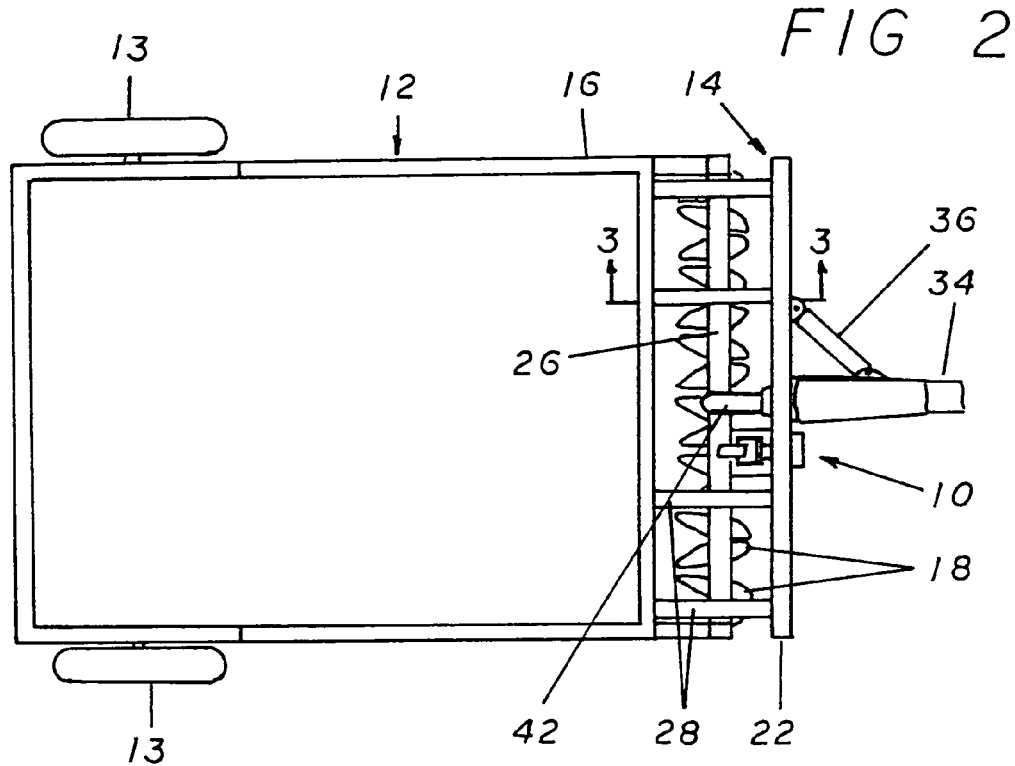
FIG. 2 is a top elevation view of a generalized towed farm implement illustrating the relative position of the present invention in relation to the major components of the farm implement.
Figure 3:
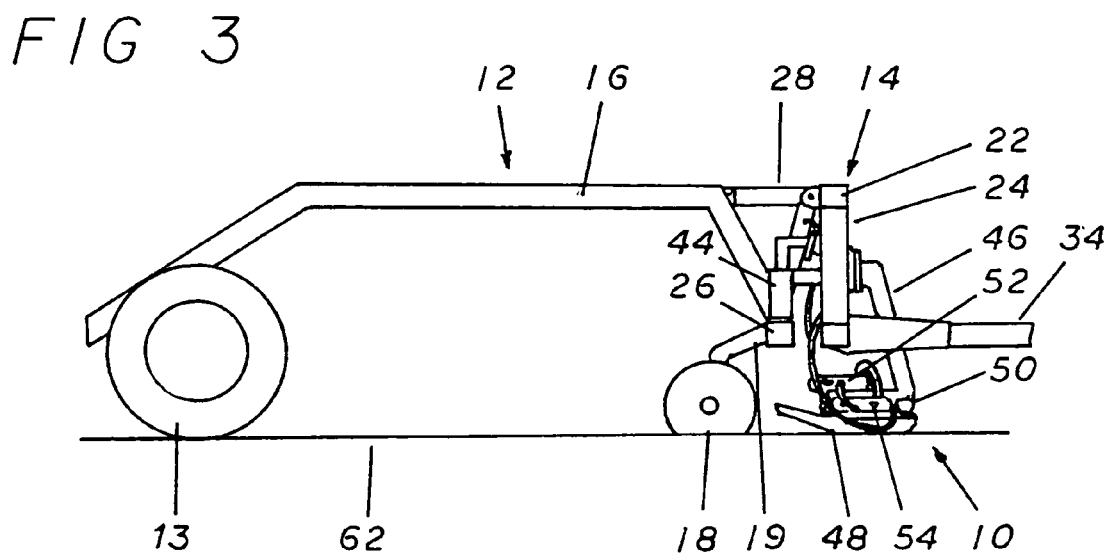
FIG. 3 is a side elevation view of the farm implement of FIG. 2 further illustrating the position of the present invention in relation to the major components of such an implement.

Referring now to the drawings, and more specifically to FIGS. 1, 2, and 3, the positioning control apparatus 10 is a device that connects to towed farm implements such as a harvester 12 or other similar devices and is employed to keep the harvester 12 in the proper alignment when a farmer is working in a row crop. For the purpose of simplicity, the positioning control apparatus 10 herein illustrated is represented as used in conjunction with a harvester 12 but it must be noted that it would work equally well with any towed implement commonly used in the working of row crop fields. Additionally, the illustrated harvester 12 is intended to represent a generalized form of harvesters and is not intended as a depiction of a specific type of implement.

The harvester 12 is generally made up of two connected frames. The most forward of these is the primary frame 14 which is the portion of the harvester 12 employed to attach it to the towing vehicle and from which the second portion, the pivoting frame 16, extends rearward from. The primary frame 14 consists of lower frame member 20 which is a horizontally oriented rectangular tube that extends across the most forward end of the harvester 12 in a perpendicular manner. The upper surface of the lower frame member 20 is equipped with a plurality of upwardly extending vertical frame members 24 which are in turn attached at their upper end to the lower surface of the upper frame member 22. Thus, the lower and upper frame members, 20 and 22, form a vertically oriented rectangular box which creates the base upon which the remaining components of the harvester 12 are constructed.

The center of the lower frame member 20 also serves as the attachment point for the harvester tongue 34 at the tongue pivot mount 40. The harvester tongue 34 ties the harvester 12 to the towing vehicle and the tongue pivot mount 40 allows it to pivot from side to side in the horizontal axis. This pivoting motion allows the track of the harvester 34 to be adjusted independently from the track of the towing vehicle thus, providing a mechanism to maintain the proper orientation of the harvester 12 relative to the row crop during farming operations. Additionally, the ninety degree angle formed at the junction of the lower frame member 20 and the harvester tongue 12 is spanned at a forty five degree angle by the horizontal adjustment cylinder 36. The horizontal adjustment cylinder 36 is pivotally mounted on either end to the lower frame member 20 and harvester tongue 34 by the use of a pair of cylinder mounts 38 that extend outward from the surfaces of these two components. The horizontal adjustment cylinder 36 operates through the activation of the harvesters's 12 hydraulic system (to be discussed in greater detail below) through its expansion and contraction which changes the tracking angle of the harvester 12 relative to the towing vehicle. This allows the operator of the towing vehicle to make adjustments in the track of the harvester 12 to compensate for variances in the track of the towing vehicle and anomalies in the rows of the crop being worked on.

The primary frame 14 also serves as the attachment point for the pivot frame 16 which extends rearward from this attachment. The attachment of the pivot frame 16 to the primary frame 14 is accomplished through the use of a plurality of pivot members 28 which extend rearward from the upper frame member 22 to the most forward upper surface of the pivot frame 16. The pivot members 28 are pivotally mounted on either end to these surfaces by the use of the pivot member mounts 30 which allow them to freely pivot in the vertical plane while providing a secure method of attachment in the horizontal plane. This method of attachment allows the orientation of the pivot frame 16 to be altered in the vertical plane in relation to the orientation of the primary frame 14 which is critical to the operation of the harvester 12 as it allows the digging discs 18 to be engaged and disengaged with the surface of the ground 62 during the operation of the harvester 12.

An additional component tying the pivot frame 16 to the primary frame 14 is the vertical adjustment cylinder 42. The vertical adjustment cylinder 42 extends in a diagonal orientation from the lower surface of the upper frame member 22 to the upper surface of the pivot frame disc mount frame 26 and is the mechanism of the harvester 12 employed to alter the vertical orientation of the pivot frame 16 to the primary frame 14. The altering of this relationship is accomplished by the expansion and contraction of the vertical adjustment cylinder 42 (again by the activation of the harvester's hydraulic system) which increases or decreases the distance between the upper frame member 22 of the primary frame 14 and the pivot frame disc mount frame 26 of the pivot frame 16. This variance is facilitated by the use of the pivot members 28 discussed above as they provide a mechanism by which the pivot frame 16 can pivot around their connection with the primary frame 14.

The pivoting nature of the pivoting frame 16 is the mechanism which allows the operator to raise and lower the digging discs 18 attached to the lower surface of the pivot frame disc mount frame 26 by the use of the disc mounts 19. The raising and lowering of the digging discs 18 is pivotal to the operation of the harvester 12 as it allows the operator to engage and disengage the digging discs 18 with the surface of the ground 62 as required by the nature of the operation being performed by the harvester 12.

The body of the harvester 12 is primarily composed of the pivot frame 16 which is a cart like apparatus having vertical pivot frame members 32 at its most forward end connecting it to the pivot members 28 and the pivot frame disc mount frame 26. The rearward end of the pivot frame 16 is equipped with a pair of harvester wheels 13 which allow the harvester 12 to be towed while providing an accurate tracking mechanism to apply the steering inputs supplied by the horizontal adjustment cylinder 36 as described above.

The attachment of the present invention to the harvester 12 is illustrated in FIGS. 3, 4, and 5 which detail its manner of construction and its relationship to the operational components of the harvester 12. The present invention is fixedly attached to the upper surface of the pivot frame disc mount frame 26 by the use of the position apparatus mount 44. The position apparatus mount 44 is a right angled frame member having a U-shaped vertical portion that engages the upper surface of the pivot frame disc mount frame 26 and from which has extending from it in a forward manner a horizontal section which provides the point of attachment for the position frame pivot mount 66. Additionally, the upper surface of the position apparatus mount 44 has an additional right angled electric actuator mount 64 which extends out and forward. The electric actuator mount 64 serves as the point of attachment for the electric linear actuator 56 which is employed to adjust the relative height of the present invention in relation to the harvester 12 through its attachment to the position frame pivot mount 66.

The position frame pivot mount 66 functions to tie the position apparatus mount 44 to the position apparatus frame 46 and consists of two pivot mount brackets 70, one of which is attached to the forward surface of the position apparatus mount 44 and the other is attached to the rearward surface of the position apparatus frame 46. The gap between the pivot mount brackets 70 is spanned by a plurality of pivot mount rails 68 which are rectangular bars each of which is pivotally fixed on either end to opposite pivot mount brackets 70 thus, forming a box-like configuration in which the two pivot mount brackets 70 are capable of moving in a vertical manner with respect to one another. This method of attachment of the position apparatus frame 46 to the position apparatus mount 44 allows the position apparatus frame 46 to be raised and lowered in relation to the body of the harvester 12.

The raising and lowering of the present invention through the position apparatus frame 46 is accomplished through the operation of the electric linear actuator 56. The electric linear actuator 56 operates in much the same fashion as a hydraulic cylinder except it functions through the use of electricity instead of hydraulic pressure which avoids the pulsating tendencies associated with the use of hydraulics. The expansion of the electric linear actuator 56 forces the position apparatus frame 46 in an outward and downward fashion through its connection with the position frame pivot mount 66. This motion in turn lowers the present invention into the desired position on the surface of the ground 62 so that it can function to control the orientation of the harvester 12 relative to the primary and pivot frames, 14 and 16. The present invention is positioned in this ground 62 engaged orientation during field operations to control the vertical and horizontal attitude of the harvester 12. Conversely, during the transport or storage of the harvester 12, the flow of hydraulic pressure is reversed thereby lifting the present invention off of the ground 62 through the raising of the position apparatus frame 46.

The position apparatus frame 46 is C-shaped section of tubular frame with the open portion of the C facing towards the body of the harvester 12. Further, the top portion of the position apparatus frame 46 extends through the gap between the lower and upper frames, 20 and 22, of the primary frame 14 and the lower end of the position apparatus frame 46 terminates below the lower surface of the lower frame member 20. Additionally, the lower portion of the position apparatus frame 46 forms the point of attachment for the position apparatus feet 48 which are the components of the present invention used to monitor the relative position of the surface of the ground 62 and which provide the inputs necessary to make the alterations to the orientation of the harvester 12.

The position apparatus feet 48 are attached to the lower surface of the position apparatus frame 46 by the use of the feet mount pin 80 which extends through the body of the position apparatus frame 46 down to its T connection with the feet cross bar 110 (not shown in these FIGURES). At either end of the feet cross bar 110 there is attached a feet ball joint 50 which provides a mounting mechanism for the position apparatus feet 48 that is freely pivotal in all rotational planes. Additionally, each of the two position apparatus feet 48 are independently mounted to the invention through the use of the feet ball joints 50 which means that they are both fully and independently pivotal.

The position apparatus feet 48 are connected to a vertical sensing valve 52 and a horizontal sensing valve 54 through the vertical linkage assembly 58 and the horizontal linkage assembly 60 respectively. The vertical linkage assembly 58 transfers vertical inputs from the position apparatus feet 48 to the vertical sensing valve 52 which imparts correcting impulses to the harvester through the hydraulic system (to be discussed in detail below). The vertical linkage assembly 58 is made up of two identical vertical pivot bracket 78 which are mounted on opposite sides of the lower end of the position apparatus frame 46 in their centers by the use of the pivot pins 79. The vertical pivot brackets 78 are relatively short sections of flat metal having an angled lower section that is offset by forty five degrees in a rearward manner from the longitudinal axis of the vertical pivot brackets 78. The upper ends of the vertical pivot brackets 78 are pivotally attached to the outer ends of the vertical linkage T-rod 83 which spans the space between the upper ends of the vertical pivot brackets 78 above the upper surface of the position apparatus frame 46. The vertical linkage T-rod 83 is in turn connected at its center to the forward end of the vertical actuator valve rod 84 which engages the vertical sensing valve 52 at its rearward end. Finally, the lower ends of the vertical pivot brackets 78 are pivotally attached to the upper ends of the vertical linkages 82 which are in turn attached at their lower ends to the position apparatus feet 48. Thus, when the position apparatus feet 48 are forced upwards or downwards, the vertical pivot brackets 78 rotate around the pivot pins 79 forcing the vertical linkage T-rod 83 to move forward or rearward which is transferred to the vertical sensing valve 52 through the vertical actuator valve rod 84.

The horizontal linkage assembly 60 transfers horizontal inputs from the position apparatus feet 48 to the horizontal sensing valve 54 which imparts correcting impulses to the harvester through the hydraulic system to be discussed in detail below. The horizontal linkage assembly 60 is made up of the horizontal valve actuator rod 104 which is pivotally connected at its forward end to the upper surface of the feet cross bar 110 and at its rearward end to the horizontal sensing valve 54. Thus, any change in horizontal attitude of the position apparatus feet 48 is transferred to the horizontal sensing valve 54 through the horizontal valve actuator rod 104.

The positional inputs of the position apparatus feet 48 are transferred to the harvester's 12 horizontal adjustment cylinder 36 and vertical adjustment cylinder 42 through the present invention's hydraulic system. The hydraulic pressure necessary to operate these components of the invention is supplied from a connection with the towing vehicle's hydraulic system through a connection at the main pressure port 98 located on the pressure manifold 96 which is in turn connected to the horizontal sensing valve 54. The pressure manifold 96 operates to divide the flow of hydraulic pressure into two separate systems. The first of these provides hydraulic pressure to the horizontal sensing valve 54 and its related components which is initially facilitated by the connection between the two. The hydraulic pressure contained within the horizontal sensing valve 54 can then be diverted to the harvester's 12 horizontal adjustment cylinder 36 by the action described above through the cylinder pressure hose 72 which runs from the upper surface of the horizontal sensing valve 54 to the horizontal adjustment cylinder 36. Additionally, a cylinder return line 74 runs from the opposite end of the horizontal adjustment cylinder 36 to the horizontal sensing valve 54 to complete the system. The hydraulic pressure is returned to the towing vehicle by means of the horizontal valve return hose 86 which connects to the return manifold 76 located on the other side of the invention. Finally, the connection between the horizontal sensing valve 54 and the horizontal valve return hose 86 contains a one-way valve that will not allow the hydraulic pressure to back flow into the horizontal sensing valve 54 during its operation.

The second hydraulic system contained within the present invention supplies the vertical sensing valve 52 which is connected to the pressure manifold 96 through the vertical valve pressure hose 102. The hydraulic pressure contained within the vertical sensing valve 52 can then be diverted to the harvester's 12 vertical adjustment cylinder 42 by the action described above first through the vertical adjustment cylinder pressure hose 90 which runs to the forward end of the pressure manifold 96. From this point, the hydraulic pressure exits the lift cylinder pressure port 100 which has connected to it a cylinder pressure hose 72 which in turn supplies the vertical adjustment cylinder 42 with hydraulic pressure. Additionally, a cylinder return hose 74 runs from the opposite end of the vertical adjustment cylinder 42 to the vertical adjustment cylinder return port 92 located on the return manifold 76 to complete this portion of this system. The hydraulic pressure is then returned to the towing vehicle through the main return port 94 located on the return manifold 94.

Figure 6:
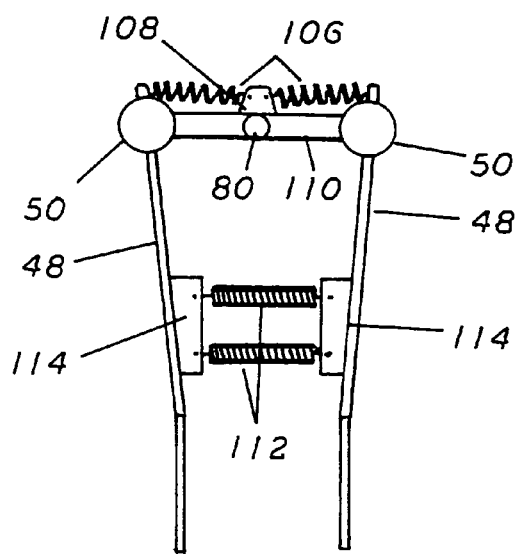
FIG. 6 is a top elevation view of the sensing feet components of the present invention illustrating their manner of construction and their orientation in the neutral or closed position.
Figure 7:
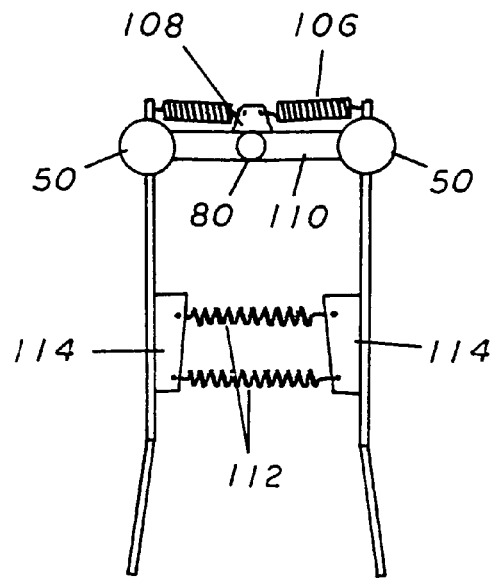
FIG. 7 is a top elevation view of the sensing feet components of the present invention of FIG. 6 and illustrating their orientation when in the open position.

The manner of construction of the position apparatus feet 48 is further detailed in FIGS. 6 and 7 which illustrate their ability to adjust to row crops of varying sizes without affecting the performance of the present invention. The use of the feet ball joints 50 to connect the position apparatus feet 48 to the feet cross bar 110 allows each of them to move independently from one another. In order to tie their motion more closely together, the invention employs a pair of open springs 106 attached to their rearward most ends and a centrally located open spring tab 108 that place a opening force on the forward points of the position apparatus feet 48. Additionally, the inner area of the position apparatus feet 48 at their midway point at a pair of inwardly extending spring brackets 114 are equipped with a pair of close springs 112 which place a closing force on them. These forces act to maintain the position apparatus feet 48 in a neutral position unless an object is encountered that tends to force them open.

Figure 8:
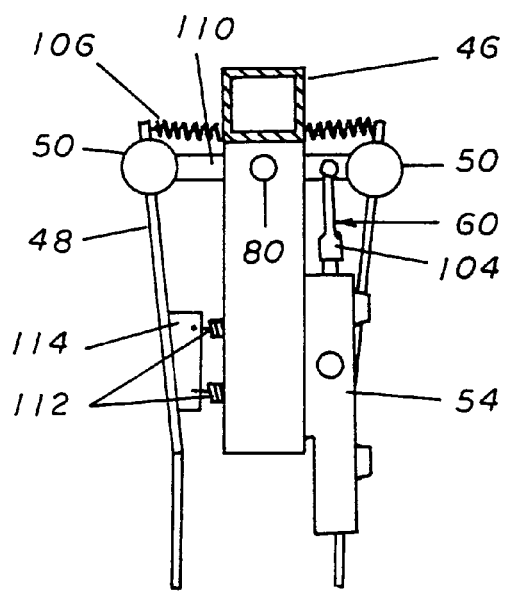
FIG. 8 is a top elevation cut-away view of the sensing feet components of the present invention taken along line 4 of FIG. 4 and illustrating their orientation when they are in the neutral horizontal position.
Figure 9:
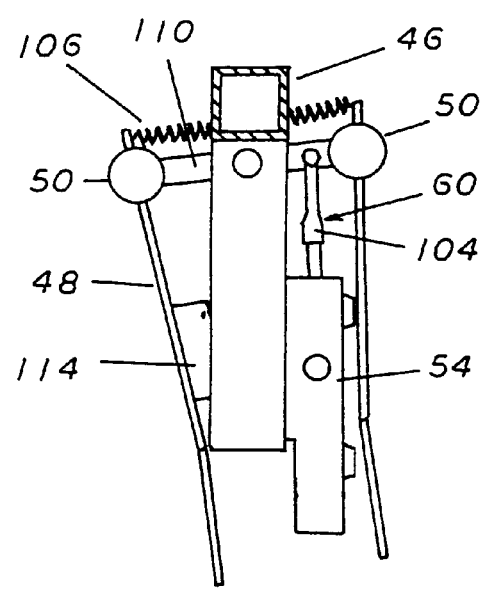
FIG. 9 is a top elevation cut-away view of the sensing feet components of the present invention taken along line 4 of FIG. 4 and illustrating their orientation when they are in the activated horizontal position.

The operation of the horizontal sensing valve 54 is further detailed in FIGS. 8 and 9 which illustrate the manner in which horizontal variations in a row crop are sensed by the position apparatus feet 48. FIG. 8 illustrates the orientation of the position apparatus feet 48 in the neutral position. Conversely, FIG. 9 illustrates the orientation of the position apparatus feet 48 when a force has deviated them in one direction or the other. The deviation of the position apparatus feet 48 is transferred to the feet cross bar 110 which in turn changes the lateral orientation of the connected horizontal valve actuator rod 104. The change in the orientation of the horizontal valve actuator rod 104 activates the horizontal sensing valve 54 which in turn makes the appropriate adjustments in the hydraulic system to return the harvester 12 to the proper orientation with respect to row crop. Once these adjustments have been accomplished, the position apparatus feet 48 return to their neutral position and the inputs of the horizontal sensing valve 54 are ceased.

The operation of the vertical sensing valve 52 is further detailed in FIGS. 10 and 11 which illustrate the manner in which horizontal deviations in the surface of the ground 62 are sensed and transferred to the appropriate components of the present invention. FIG. 10 illustrates the position of the position apparatus feet 48 when they are in their neutral orientation in respect to the vertical plane. Conversely, FIG. 11 illustrates the orientation of the pertinent components of the invention when an irregularity 61 is encountered by the position apparatus feet 48. The change in attitude in the position apparatus feet 48 caused by the irregularity 61 is transferred to the vertical sensing valve 52 through the vertical linkage assembly 58 as described above. This engages the vertical sensing valve 52 which in turn activates the hydraulic system to make appropriate height adjustments in the attitude of the harvester 12 to bring the position apparatus feet 48 back to their neutral position.

Although the present invention has been described in considerable detail with reference to certain preferred versions thereof, other versions are possible. Therefore, the spirit and scope of the appended claims should not be limited to the description of the preferred versions contained herein.

What is claimed is:

1. An automatic row crop implement positioner for use on an implement having a tongue hitch pivotally mounted in a horizontal plane to a primary frame which is pivotally mounted in a vertical plane to a pivot frame, said automatic row crop implement positioner comprising:
    an implement positioner frame mounted to a said pivot frame;
    a left and right foot ball joint mounted to said implement positioner frame;
    a left and right elongate positioner apparatus foot each of said left and right feet having a forward and rearward end, said forward end being mounted to said left and right foot ball joint such that said left and right foot may pivot about said foot ball joint in both a horizontal and vertical plane;
    a means of detecting vertical movement of said left and right feet and a means of imparting vertical movement to said main pivot frame so as to move said main pivot frame in a vertical plane; and
    a means of detecting horizontal movement of said left and right feet and a means of imparting horizontal movement to said main pivot frame so as to move said main pivot frame in a horizontal plane.

2. An automatic row crop implement positioner as in claim 1 wherein said means of detecting vertical movement of said left and right foot is a vertical sensing valve connected to said left and right feet.

3. An automatic row crop implement positioner as in claim 2 wherein said means of detecting horizontal movement of said left and right foot is a horizontal sensing valve connected to said left and right feet.

4. An automatic row crop implement positioner as in claim 3 wherein said means of imparting vertical movement to said main pivot frame is a vertical adjustment cylinder pivotally attached between said pivot frame and said primary frame.

5. An automatic row crop implement positioner as in claim 4 wherein said means of imparting horizontal movement to said main pivot frame is a hydraulic cylinder pivotally mounted to said tongue hitch and said primary frame.

6. An automatic row crop implement positioner as in claim 5 further comprising at least one spring biasing said left and right elongate positioner apparatus feet to an operating position.

7. An automatic row crop implement positioner as in claim 5 further comprising an electric actuator for raising and lowering said implement positioner frame.

8. An automatic row crop implement positioner as in claim 7 further comprising a left and right wheel on said pivot frame.

9. An automatic row crop implement positioner for use on an implement having a tongue hitch pivotally mounted in a horizontal plane to a primary frame which is pivotally mounted in a vertical plane to a pivot frame, said automatic row crop implement positioner comprising:
    an implement positioner frame mounted to a said pivot frame;
    a left and right foot ball joint mounted to said implement positioner frame each of said foot ball joints having a ball and socket type fitting;
    a left and right elongate positioner apparatus foot each of said left and right feet having a forward and rearward end and a mid section, said forward end being mounted to said left and right foot ball joint such that said left and right foot may pivot about said foot ball joint in both a horizontal and vertical plane;
    a first and second open spring at said forward ends of said left and right elongate positioner apparatus foot so as to bias said forward ends inward toward each other;
    a first and second close spring at said mid sections of said left and right elongate positioner apparatus foot so as to bias said mid sections inward toward each other;
    a means of detecting vertical movement of said left and right feet and a means of imparting vertical movement to said main pivot frame so as to move said main pivot frame in a vertical plane; and
    a means of detecting horizontal movement of said left and right feet and a means of imparting horizontal movement to said main pivot frame so as to move said main pivot frame in a horizontal plane.

10. An automatic row crop implement positioner as in claim 9 wherein said means of detecting vertical movement of said left and right foot is a vertical sensing valve connected to said left and right feet.

11. An automatic row crop implement positioner as in claim 10 wherein said means of detecting horizontal movement of said left and right foot is a horizontal sensing valve connected to said left and right feet.

12. An automatic row crop implement positioner as in claim 11 wherein said means of imparting vertical movement to said main pivot frame is a vertical adjustment cylinder pivotally attached between said pivot frame and said primary frame.

13. An automatic row crop implement positioner as in claim 12 wherein said means of imparting horizontal movement to said main pivot frame is a hydraulic cylinder pivotally mounted to said tongue hitch and said primary frame.

14. An automatic row crop implement positioner as in claim 13 further comprising an electric actuator for raising and lowering said implement positioner frame.

15. An automatic row crop implement positioner as in claim 14 further comprising a left and right wheel on said pivot frame.

16. An automatic row crop implement positioner for use on an implement having a tongue hitch pivotally mounted in a horizontal plane to a primary frame which is pivotally mounted in a vertical plane to a pivot frame, said automatic row crop implement positioner comprising:
    an implement positioner frame mounted to a said pivot frame;

a left and right foot ball joint mounted to said implement positioner frame each of said foot ball joints having a ball and socket type fitting;

a left and right elongate positioner apparatus foot each of said left and right feet having a forward and rearward end and a mid section, said forward end being mounted to said left and right foot ball joint such that said left and right foot may pivot about said foot ball joint in both a horizontal and vertical plane;

a first and second open spring at said forward ends of said left and right elongate positioner apparatus foot so as to bias said forward ends inward toward each other;

a first and second close spring at said mid sections of said left and right elongate positioner apparatus foot so as to bias said mid sections inward toward each other;

a vertical sensing valve for detecting vertical movement of said left and right feet and a vertical adjustment cylinder pivotally attached between said pivot frame and said primary frame for imparting vertical movement to said main pivot frame so as to move said main pivot frame in a vertical plane; and a horizontal sensing valve for detecting vertical movement of said left and right feet and a hydraulic cylinder pivotally mounted to said tongue hitch and said primary frame for imparting horizontal movement to said main pivot frame so as to move said main pivot frame in a horizontal plane.

17. An automatic row crop implement positioner as in claim 16 further comprising an electric actuator for raising and lowering said implement positioner frame.

18. An automatic row crop implement positioner as in claim 17 further comprising a left and right wheel on said pivot frame.

* * * * *